United States Patent
Tanaka et al.

(10) Patent No.: US 11,124,426 B2
(45) Date of Patent: Sep. 21, 2021

(54) PREPARATION OF SINTERABLE GARNET-STRUCTURE COMPLEX OXIDE POWDER AND MANUFACTURING OF TRANSPARENT CERAMICS

(71) Applicant: SHIN-ETSU CHEMICAL CO., LTD., Tokyo (JP)

(72) Inventors: Keita Tanaka, Annaka (JP); Masanori Ikari, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 446 days.

(21) Appl. No.: 16/215,859

(22) Filed: Dec. 11, 2018

(65) Prior Publication Data

US 2019/0177175 A1   Jun. 13, 2019

(30) Foreign Application Priority Data

Dec. 12, 2017   (JP) .............................. JP2017-237466

(51) Int. Cl.
*C01F 7/02*     (2006.01)
*C04B 35/645*   (2006.01)
(Continued)

(52) U.S. Cl.
CPC .............. *C01F 17/34* (2020.01); *C01F 17/30* (2020.01); *C04B 35/44* (2013.01); *C04B 35/50* (2013.01); *C04B 35/6263* (2013.01); *C04B 35/62605* (2013.01); *C04B 35/62625* (2013.01); *C04B 35/62635* (2013.01); *C04B 35/62685* (2013.01); *C04B 35/645* (2013.01); *C04B 35/6455* (2013.01); *G02B 1/00* (2013.01); *C01P 2002/30* (2013.01); *C01P 2002/54* (2013.01);
(Continued)

(58) Field of Classification Search
None
See application file for complete search history.

(56) References Cited

U.S. PATENT DOCUMENTS 4,350,588 A    9/1982 Boudot et al.
5,484,750 A *  1/1996 Greskovich ............ C01G 15/00
                                              252/301.4 F
(Continued)

FOREIGN PATENT DOCUMENTS

CA    1 147 942 A    6/1983
EP    1 391 544 A2   2/2004
(Continued)

OTHER PUBLICATIONS

Extended European Search Report dated Feb. 14, 2019, in European Patent Application No. 18210382.0.

*Primary Examiner* — Erin Snelting
(74) *Attorney, Agent, or Firm* — Birch, Stewart, Kolasch & Birch, LLP

(57) ABSTRACT

A garnet-structure complex oxide powder having formula (1) is prepared by adding an aqueous solution containing (a) Tb ion, an aqueous solution containing (b) Al ion, and an aqueous solution containing (c) Sc ion to a co-precipitating aqueous solution, to induce a co-precipitate of components (a), (b) and (c), filtering, heat drying and firing the co-precipitate.

$$(R_{1-x}Sc_x)_3(A_{1-y}Sc_y)_5O_{12} \qquad (1)$$

R is yttrium or a lanthanoid element, typically Tb, A is a Group 13 element, typically Al, x and y are $0<x<0.08$ and $0.004<y<0.16$.

10 Claims, 3 Drawing Sheets

(51) Int. Cl.
*C04B 35/626* (2006.01)
*C04B 35/44* (2006.01)
*C01F 17/34* (2020.01)
*G02B 1/00* (2006.01)
*C04B 35/50* (2006.01)
*C01F 17/30* (2020.01)

(52) U.S. Cl.
CPC ...... *C01P 2002/76* (2013.01); *C01P 2004/60* (2013.01); *C01P 2004/61* (2013.01); *C01P 2004/62* (2013.01); *C01P 2004/64* (2013.01); *C01P 2006/60* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3286* (2013.01); *C04B 2235/602* (2013.01); *C04B 2235/604* (2013.01); *C04B 2235/606* (2013.01); *C04B 2235/656* (2013.01); *C04B 2235/6562* (2013.01); *C04B 2235/6567* (2013.01); *C04B 2235/6583* (2013.01); *C04B 2235/662* (2013.01); *C04B 2235/663* (2013.01); *C04B 2235/764* (2013.01); *C04B 2235/781* (2013.01); *C04B 2235/9646* (2013.01); *C04B 2235/9653* (2013.01)

(56) References Cited

U.S. PATENT DOCUMENTS

| | | |
|---|---|---|
| 9,470,915 B2 | 10/2016 | Makikawa et al. |
| 2004/0035357 A1 | 2/2004 | Sekijima et al. |
| 2016/0145765 A1 | 5/2016 | Matsui et al. |

FOREIGN PATENT DOCUMENTS

| | | |
|---|---|---|
| EP | 2 687 500 A1 | 1/2014 |
| EP | 3 012 353 A1 | 4/2016 |
| FR | 2 469 478 | 5/1981 |
| JP | 4878343 B2 | 2/2004 |
| JP | 3642063 B2 | 4/2005 |
| JP | 5704097 B2 | 4/2015 |
| JP | 5935764-62 | 6/2016 |
| WO | WO 2017/033618 A1 | 3/2017 |
| WO | WO 2018/193848 A1 | 10/2018 |

\* cited by examiner

PREPARATION OF SINTERABLE GARNET-STRUCTURE COMPLEX OXIDE POWDER AND MANUFACTURING OF TRANSPARENT CERAMICS

CROSS-REFERENCE TO RELATED APPLICATION

This non-provisional application claims priority under 35 U.S.C. § 119(a) on Patent Application No. 2017-237466 filed in Japan on Dec. 12, 2017, the entire contents of which are hereby incorporated by reference.

TECHNICAL FIELD

This invention relates to a method for preparing a sinterable garnet-structure complex oxide powder and a method for manufacturing a transparent ceramic material. More particularly, it relates to a method for preparing a sinterable garnet-structure complex oxide powder for use as a magnetooptical material comprising garnet-structure transparent ceramic material containing a rare earth element, typically terbium, suited to construct magnetooptical devices such as optical isolators.

BACKGROUND ART

As the output power of lasers increases in recent years, the laser processing technology using fiber lasers is ascendant. For consistent laser processing, it is necessary to remove external light to prevent the oscillating state from disturbance. If light is reflected at the end surface of a fiber, the reflected light reaches the laser light source and as a result, significantly disturbs the oscillation. For this reason, a common fiber laser system is provided with a part known as an isolator at the interconnect boundary between fibers to completely suppress the reflected light.

The optical isolator comprises three parts, a Faraday rotator, a polarizer arranged on the incident side of the Faraday rotator, and an analyzer arranged on the emergent side of the Faraday rotator. On use of the Faraday rotator, a magnetic field is applied parallel to the light traveling direction. Then, the polarization of light is rotated only in a given direction independent whether it travels forward or backward through the Faraday rotator. Further, the length of the Faraday rotator is adjusted such that the polarization of light is rotated just 45°. With the setting that the planes of polarization of the polarizer and the analyzer are shifted 45° with respect to the rotational direction of light, the polarization of the forward traveling light is coincident at the positions of the polarizer and the analyzer and is transmitted. On the other hand, the polarization of the backward traveling light is rotated 45° counter to the shift angle direction of the plane of polarization of the polarizer shifted 45° from the position of the analyzer. Then, the plane of polarization of the return light at the position of the polarizer is shifted 45°−(−45°)=90° with respect to the plane of polarization of the polarizer, and the return light is not transmitted by the polarizer. In this way, the function of an optical isolator that transmits and emits the forward traveling light, but shuts off the backward traveling light is obtained.

The prior art materials of which the Faraday rotator is made include, for example, garnet-structure $Tb_3Ga_5O_{12}$ (Patent Document 1), $Tb_3Al_5O_{12}$ (Patent Document 2), and C-type rare earth base $(Tb_xRe_{(1-x)})_2O_3$ (Patent Document 3). These materials commonly contain terbium characterized by low light absorption at wavelength 1,064 nm used as the laser and a high Verdet constant (or magnetooptical constant).

It is noted that magnetooptical materials have their own problems. Since the $Tb_3Ga_5O_{12}$ (TGG) of garnet structure has a low Verdet constant due to a low content of terbium in crystals, the Faraday rotator must be lengthened, tending to detract from laser quality. On the other hand, the $Tb_3Al_5O_{12}$ (TAG) of garnet structure uses aluminum having a smaller ion radius than gallium and has a higher content of terbium in crystals, and the Faraday rotator can be shortened. However, since the TAG is an incongruent melting crystal, there is the restriction that a perovskite phase is first created at the solid-liquid interface, and a TAG phase is subsequently created. Namely, TAG crystals can always be grown as a mixture of garnet and perovskite phases. The growth of TAG crystals of large size and high quality has not been established. Finally, the C-type rare earth base $(Tb_xRe_{(1-x)})_2O_3$ is increased in terbium content as compared with other materials, contributing to the shortening of isolators, but there is a likelihood that higher valence terbium generates, indicating noticeable light absorption as compared with the garnet-structure materials. The noticeable light absorption means that when a high power laser of 100 W or higher is inserted, for example, the isolator itself is greatly heated by the light energy absorbed, and as a result, laser quality is exacerbated.

The Faraday rotator which is most commonly used at the present is TGG. Since the TGG has a low Verdet constant, an improvement is desired. Although TAG is expected as a substitute for TGG, the growth of TAG crystals is difficult because of incongruent melting as mentioned above. Thus with the aim of producing a material approximate to TAG crystals, Patent Documents 4 and 5 disclose TAG ceramics and $Tb_3Sc_2Al_3O_{12}$ (TSAG) crystals, respectively. Since the TAG ceramics can be produced at or below the incongruent melting temperature, it is possible to control a heterogeneous phase to some extent. It is still difficult to completely suppress formation of a heterogeneous phase due to compositional shifts or the like. The TAG ceramics cause substantial scattering which is unsuitable for use in the optical application. The TSAG can correct a delicate compositional shift because incongruent melting is suppressed by adding Sc. Crystal growth is thus easy. However, the TSAG fails to clear the practical level because it is costly due to the large amount of expensive Sc used.

CITATION LIST

Patent Document 1: JP 4878343
Patent Document 2: JP 3642063 (US 20040035357, EP 1391544)
Patent Document 3: JP 5704097 (U.S. Pat. No. 9,470,915, EP 2687500)
Patent Document 4: WO 2017/033618
Patent Document 5: JP 5935764 (US 20160145765, EP 3012353)

SUMMARY OF INVENTION

An object of the invention is to provide a method for preparing a paramagnetic sinterable garnet-structure complex oxide powder having uniformly distributed three elements: rare earth element, Group 13 element and scandium, specifically terbium, aluminum and scandium, the method including synthesis via co-precipitation, and a method for manufacturing a transparent ceramic material using the powder.

The inventors started the development of TAG ceramics using the familiar transparent ceramic technology. It has been found that a delicate compositional shift can be corrected by adding several percents of Sc. The amount of Sc which is not as large as in TSAG gives an economical advantage. However, the synthesis of transparent ceramic material by the conventional wet mixing process of mixing three types of oxide powders has the problem that since the three oxide powders are different in density and hence, in buoyancy, the slurry has a compositional variation in its interior unless the size of three oxide powders is precisely controlled. The compositional variation becomes outstanding particularly in the case of cast molding, raising the problem that the molded product is divided into a fully transparent section and a less transparent section. The non-uniform distribution of transparency within the Faraday rotator is undesirable because it causes to exacerbate an extinction ratio of the Faraday rotator. The inventors then attempted to synthesize sinterable particles having terbium, aluminum and scandium all distributed uniformly, using the co-precipitation process. The discovery is applicable to a combination of a rare earth element other than Tb and a Group 13 element other than Al with scandium. The invention is predicated on this discovery and further investigations.

In one aspect, the invention provides a method for preparing a sinterable garnet-structure complex oxide powder comprising the steps of adding an aqueous solution containing (a) at least one rare earth element selected from among yttrium and lanthanoid elements in ion form, an aqueous solution containing (b) at least one element selected from Group 13 elements in ion form, and an aqueous solution containing (c) scandium ion, to a co-precipitating aqueous solution, allowing the resulting solution to induce a co-precipitate of components (a), (b) and (c), filtering, heat drying and firing the co-precipitate, thereby forming a garnet-structure complex oxide powder having the formula (1).

$$(R_{1-x}Sc_x)_3(A_{1-y}Sc_y)_5O_{12} \quad (1)$$

Herein R is at least one rare earth element selected from among yttrium and lanthanoid elements, A is at least one element selected from Group 13 elements, x and y are numbers in the range: $0<x<0.08$ and $0.004<y<0.16$.

In a preferred embodiment, component (a) is terbium ion and component (b) is aluminum ion.

In a preferred embodiment, the aqueous solutions containing components (a), (b) and (c) are mineral acid (or inorganic acid) aqueous solutions, and the co-precipitating aqueous solution is a carbonate aqueous solution.

In a preferred embodiment, the aqueous solution containing component (a), the aqueous solution containing component (b), and the aqueous solution containing component (c) are added together to a co-precipitating aqueous solution, and the resulting solution is stirred, allowing particles of the co-precipitate of components (a), (b) and (c) to grow. More preferably, the stirring is continued for at least 12 hours while keeping the solution at a temperature of from 20° C. to 50° C.

In a preferred embodiment, the aqueous solution containing component (a) and the aqueous solution containing component (b) are added together to a co-precipitating aqueous solution, the resulting solution is stirred as a first stirring step, the aqueous solution containing component (c) is added thereto, and the resulting solution is stirred as a second stirring step.

More preferably, each of the first and second stirring steps includes keeping the solution at a temperature of from 20° C. to 50° C., and the total time of the first and second stirring steps is at least 12 hours.

The firing step is typically at a temperature of from 1,000° C. to 1,400° C.

In a preferred embodiment, the garnet-structure complex oxide powder has a primary particle size of from 70 nm to 300 nm.

In another aspect, the invention provides a method for manufacturing a transparent ceramic material comprising the steps of molding the garnet-structure complex oxide powder prepared by the inventive method into a compact, sintering the compact, and pressure sintering the compact.

As used herein, the term "sinterable" powder means that the powder is to be sintered later.

Advantageous Effects of Invention

A sinterable garnet-structure complex oxide powder having scandium distributed uniformly is prepared by the co-precipitation process. By molding the powder into a compact and sintering the compact, a transparent garnet-structure ceramic material having uniform transparency is obtained.

DESCRIPTION OF PREFERRED EMBODIMENTS

Preparation of Sinterable Garnet-Structure Complex Oxide Powder

The invention provides a method for preparing a sinterable garnet-structure complex oxide powder comprising the steps of adding an aqueous solution containing (a) at least one rare earth element selected from among yttrium and lanthanoid elements in ion form, an aqueous solution containing (b) at least one element selected from Group 13 elements in ion form, and an aqueous solution containing (c) scandium ion to a co-precipitating aqueous solution, allowing the resulting solution to induce a co-precipitate of components (a), (b) and (c), filtering, heat drying and firing the co-precipitate, thereby forming a garnet-structure complex oxide powder having the formula (1).

$$(R_{1-x}Sc_x)_3(A_{1-y}Sc_y)_5O_{12} \quad (1)$$

Herein R is at least one rare earth element selected from among yttrium and lanthanoid elements, A is at least one element selected from Group 13 elements, x and y are numbers in the range: $0<x<0.08$ and $0.004<y<0.16$.

Composition

The composition of the garnet-structure complex oxide powder to which the invention pertains is represented by formula (1).

In formula (1), R is at least one rare earth element selected from among yttrium and lanthanoid elements, specifically at least one rare earth element selected from the group consisting of yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Preferably R is at least one element selected from among Y, Ce, Sm, Eu, Gd, Tb, Dy, Ho, Er, Tm, Yb, and Lu. More preferably R is Tb or a mixture of Tb and Ce.

Terbium (Tb) is an element having the maximum Verdet constant among paramagnetic elements exclusive of iron (Fe). Since Tb is non-absorptive in the 1,064-nm band used in fiber lasers, it is best suited for use in materials of optical isolators in this wavelength band. It should be noted that Tb readily reacts with airborne oxygen to generate higher valence Tb species. Since the higher valence Tb species are light absorptive, it is desirable to eliminate the higher valence Tb species as completely as possible. The best approach for eliminating the higher valence Tb species is to adopt the crystal structure which does not generate high valence Tb species, that is, the garnet structure.

In formula (1), A is at least one element selected from Group 13 elements, specifically at least one element selected from the group consisting of boron (B), aluminum (Al), gallium (Ga), indium (In) and thallium (Tl). In order that the complex oxide assume the garnet structure, A is preferably (trivalent) Ga or Al. Al is most preferred because it leads to an increase of Tb concentration in crystal and an improvement in Verdet constant. Specifically, Al is an element which has the minimum ion radius among trivalent ions that prevail stably in oxides of garnet structure and which minimizes the lattice constant of Tb-containing paramagnetic garnet-structure oxides. If the lattice constant of garnet structure can be reduced without changing the Tb content, then preferably the Verdet constant per unit length can be increased. This is actually the reason why the Verdet constant of TAG is 1.25 to 1.5 times that of TGG.

Some of complex oxides containing only Tb and Al as constituents do not assume the garnet structure due to minute weighing errors. Such complex oxides are difficult to manufacture transparent ceramic materials for use in the optical application in a stable manner. Then scandium (Sc) is added as an additional constituent to overcome the compositional variation due to minute weighing errors. Sc is an element which has an intermediate ion radius so that it may form a solid solution at both the Tb coordination site and the Al coordination site. Sc is partitioned while a partition ratio at Tb and Al sites is adjusted so as to just meet the stoichiometry of garnet. Namely, scandium functions as a buffer agent to tailor the composition and is an essential element for the invention. Although the foregoing description refers to the TAG composition, the addition of Sc enables to construct a stable garnet structure even when terbium is replaced by another rare earth element or yttrium and aluminum is replaced by another Group 13 element.

In formula (1), x is a number in the range: $0<x<0.08$, preferably $0.002 \leq x \leq 0.07$, more preferably $0.03 \leq x \leq 0.06$. As long as x is in the range, a heterogeneous phase of perovskite structure is reduced below the detectable level of X-ray diffraction (XRD) analysis. Also, a value of x in the range is preferable because the number of heterogeneous phase grains of perovskite structure (having a typical size of 1 to 1.5 μm in diameter and looking colored pale brown) is equal to or less than 1 as observed in a visual field of 150 μm×150 μm under an optical microscope. Then the concentration of the heterogeneous phase of perovskite structure is equal to or less than 1 ppm.

Also, x=0 is not preferable because of the increased risk of a heterogeneous phase of perovskite structure precipitating out. If x is equal to or more than 0.08, the effect of suppressing precipitation of a heterogeneous phase of perovskite structure is saturated and unchanged, but the solid solution concentration of element R such as terbium is unnecessarily reduced and hence, the Verdet constant is reduced. Further, since the raw material for scandium is expensive, it is not preferable from the aspect of preparation cost to dope an unnecessary excess of scandium.

In formula (1), y is a number in the range: $0.004<y<0.16$, preferably $0.01 \leq y \leq 0.15$, more preferably $0.03 \leq y \leq 0.15$. As long as y is in the range, a heterogeneous phase of perovskite structure is undetectable by XRD analysis. Also, a value of y in the range is preferable because the number of heterogeneous phase grains of perovskite structure (having a typical size of 1 to 1.5 μm in diameter and looking colored pale brown) is equal to or less than 1 as observed in a visual field of 150 μm×150 μm under an optical microscope. Then the concentration of the heterogeneous phase of perovskite structure is equal to or less than 1 ppm.

Also, $y \leq 0.004$ is not preferable because of the increased risk of a heterogeneous phase of perovskite structure precipitating out. If y is equal to or more than 0.16, the effect of suppressing precipitation of a heterogeneous phase of perovskite structure is saturated and unchanged, but the solid solution concentration of Tb is unnecessarily reduced and hence, the Verdet constant is reduced. Further, since the raw material for scandium is expensive, it is not preferable from the aspect of preparation cost to dope an unnecessary excess of scandium.

The method for preparing a sinterable garnet-structure complex oxide powder according to the invention involves the steps of forming a co-precipitate of components (a), (b) and (c), filtering, washing, drying, grinding and firing the co-precipitate. The method includes Embodiments 1 and 2, for example, which are described below.

Embodiment 1

In Embodiment 1 of the complex oxide powder preparing method, the aqueous solution containing component (a), the aqueous solution containing component (b), and the aqueous solution containing component (c) are added together to a co-precipitating aqueous solution, and the resulting solution is stirred to induce co-precipitation of components (a), (b) and (c). The phrase that the aqueous solutions are added together to a co-precipitating aqueous solution means that the relevant aqueous solutions are simultaneously added to a co-precipitating aqueous solution. Preferably the relevant aqueous solutions are mixed, and the mixture is added dropwise to a co-precipitating aqueous solution. This holds true throughout the disclosure.

Figure 1:
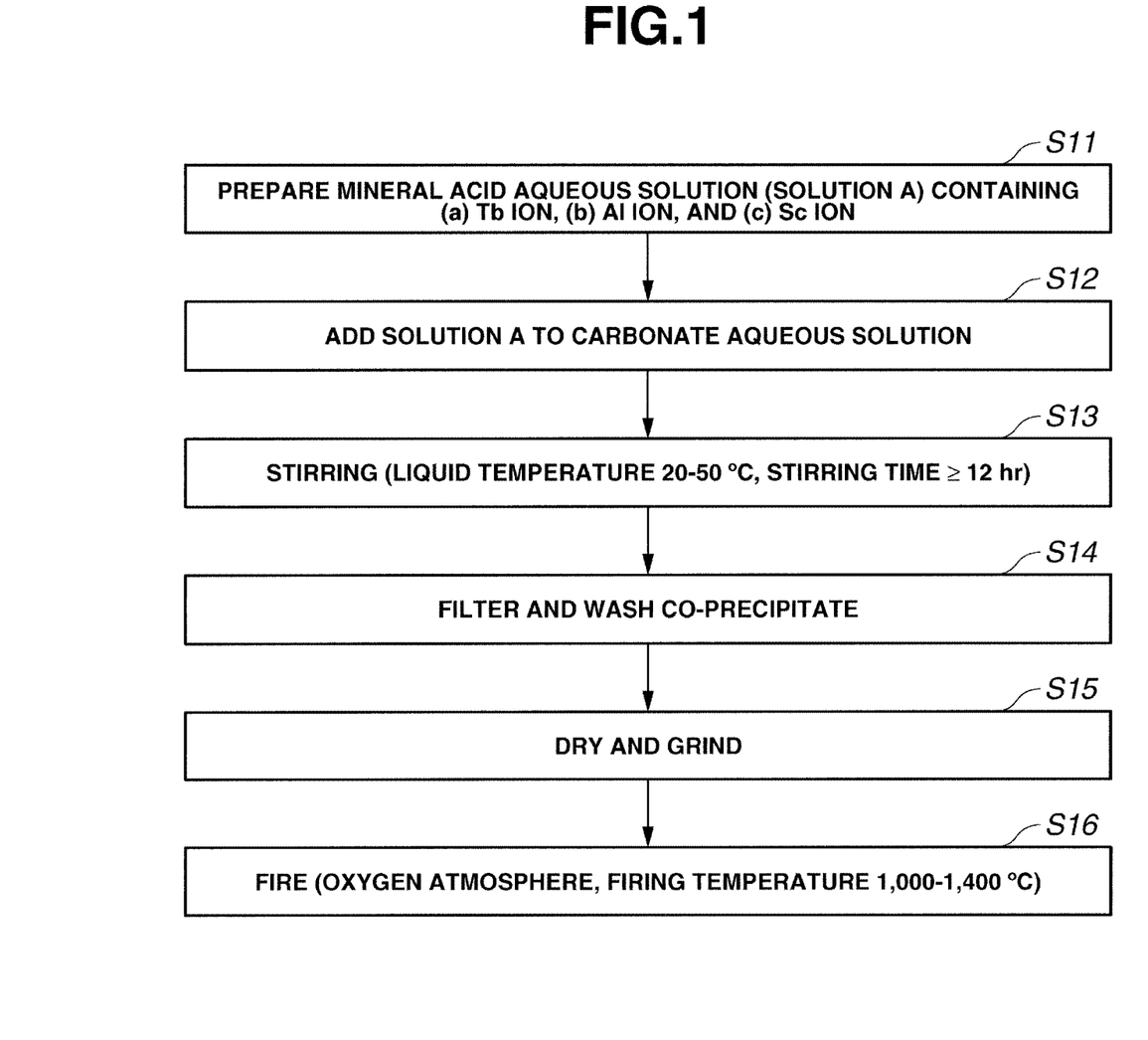
FIG. 1 is a flow chart illustrating steps of Embodiment 1 of the method for preparing a sinterable garnet-structure complex oxide powder according to the invention.

FIG. 1 shows steps in the procedure of Embodiment 1 while referring to an example where R is terbium and A is aluminum.

Step S11

A mineral acid aqueous solution (Solution A) containing (a) Tb ion, (b) Al ion, and (c) Sc ion is prepared.

Specifically, an aqueous solution containing component (a), an aqueous solution containing component (b), and an aqueous solution containing component (c) are independently furnished. The aqueous solutions containing components (a), (b) and (c), respectively, are not particularly limited as long as they contain components (a), (b) and (c) in ion form. Preferably they are mineral acid aqueous solutions.

The raw material for component (a) is preferably a powdered material having a purity of at least 99.9% by weight, more preferably at least 99.99% by weight, even more preferably at least 99.999% by weight. The raw material is not particularly limited as long as it is dissolvable in water to form an aqueous solution. Examples include terbium oxide powders such as $Tb_2O_3$ and $Tb_4O_7$ powders. Other compounds of terbium such as terbium fluoride and terbium nitride are also acceptable as long as they are dissolvable in acidic aqueous solutions to form terbium ions rather than complex ions. Terbium oxide powder is more preferable because impurity ions can adversely affect during reaction or firing.

The raw material for component (b) is preferably a powdered material having a purity of at least 99.9% by weight, more preferably at least 99.99% by weight, even more preferably at least 99.999% by weight. The raw material is not particularly limited as long as it is dissolvable in water to form an aqueous solution. Examples include aluminum nitrate, aluminum chloride, aluminum hydroxide, and aluminum ethoxide, with aluminum hydroxide being preferred.

The raw material for component (c) is preferably a powdered material having a purity of at least 99.9% by weight, more preferably at least 99.99% by weight, even more preferably at least 99.999% by weight. Scandium oxide powder is preferred. Other compounds of scandium such as scandium fluoride and scandium nitride are also acceptable as long as they are dissolvable in acidic aqueous solutions to form scandium ions rather than complex ions. Scandium oxide powder is more preferable because impurity ions can adversely affect during reaction or firing.

These raw materials for three components are dissolved in mineral acid aqueous solutions so as to reach the predetermined concentrations. The mineral acid aqueous solutions used herein are not particularly limited as long as they dissolve the raw materials for components (a), (b) and (c) to form ions of components (a), (b) and (c) rather than complex ions. Aqueous solutions of strong acids are preferred, for example, 5N nitric acid aqueous solution, sulfuric acid aqueous solution, and hydrochloric acid aqueous solution. Acidic aqueous solutions capable of dissolving the raw materials for three components completely are preferred, with nitric acid aqueous solutions being more preferred. The use of a nitric acid aqueous solution has the advantage that the amount of residual inorganic salt after firing is minimized. The aqueous solutions preferably have an acid concentration of from 1.5 M to 3.0 M.

The temperature at which aqueous solutions containing components (a), (b) and (c), respectively, are prepared is not particularly limited. When aluminum hydroxide is dissolved, for example, a temperature of at least 200° C. is undesirable because such a high temperature causes dehydration to form difficultly soluble aluminum oxide. Preferably an aqueous solution is prepared at an appropriate temperature for the relevant material.

The aqueous solution containing component (a), the aqueous solution containing component (b), and the aqueous solution containing component (c) are accurately weighed so as to achieve the desired composition or molar fraction of formula (1) and mixed with thorough stirring to form a mineral acid aqueous solution (Solution A) containing (a) Tb ion, (b) Al ion and (c) Sc ion. The molar fraction directly leads to a weight ratio of the raw material powder obtained by the co-precipitation process.

Alternatively, a mineral acid aqueous solution (Solution A) containing (a) Tb ion, (b) Al ion and (c) Sc ion may be obtained by weighing a raw material for component (a), a raw material for component (b), and a raw material for component (c) so as to achieve the desired composition or molar fraction of formula (1), mixing the raw materials together, and dissolving the powder mixture in a mineral acid aqueous solution, or by sequentially dissolving the raw materials for the three components in a mineral acid aqueous solution. Step S11 is complete at this point.

Step S12

Solution A is added to a co-precipitating aqueous solution (Solution B). The co-precipitating aqueous solution used herein is not particularly limited, provided that upon addition of a mineral acid aqueous solution containing ions of three components (a), (b) and (c) thereto, it allows all ions of three components to co-precipitate, and it is removable from the co-precipitate by water washing and filtration. Examples include aqueous ammonia ($NH_4OH$), and aqueous solutions of oxalic acid (($COOH)_2$), ammonium hydrogencarbonate ($NH_4HCO_3$), and ammonium carbonate (($NH_4)_2CO_3$). Inter alia, carbonate aqueous solutions are preferred, with ammonium hydrogencarbonate aqueous solution being most preferred. Notably, a precipitation aid such as ammonium sulfate may be added to the co-precipitating aqueous solution.

After the (dropwise) addition of Solution A, the resulting liquid (Solution B+A) preferably has a pH value of from 5.8 to less than 7.0, more preferably from 6.1 to less than 6.6. In this case, a uniform precipitate having the desired composition is obtained. If the pH of the liquid is lower than 5.8, there is the risk of failing to achieve the desired composition because Tb is soluble in such a pH region. If the pH of the liquid is equal to or higher than 7.0, only one of precipitated Tb and Al precursors is dispersed due to the zeta potential difference between the Tb and Al precursors, with a possibility that a uniform precipitate is not obtained.

The amount of the co-precipitating aqueous solution (Solution B) is preferably adjusted such that the solution reaches in the above range of the pH value at the completion of dropwise addition of Solution A.

Preferably Solution A is added dropwise to the co-precipitating aqueous solution, more preferably added dropwise with stirring.

Step S13

Following the addition of Solution A to Solution B, the liquid (Solution B+A) is stirred. Once Solution A is added to Solution B, a white precipitate which is a co-precipitate of components (a), (b) and (c) forms, but precipitation of components (a), (b) and (c) is not uniform. Thorough stirring is performed so that particles of the co-precipitate grow.

The co-precipitating aqueous solution having Solution A added thereto (Solution B+A) may be stirred by a rotor at a rotational speed of at least 200 rpm while the solution is kept in a water bath at a temperature from 20° C. to 50° C. If the liquid temperature exceeds 50° C., particles of the co-precipitate grow so large that the resulting powder is unlikely to transparentize in the subsequent sintering step.

As long as the stirring (rotational) speed is at least 200 rpm, the speed is not particularly limited. Stirring is continued even after Solution A is added in entirety. The overall stirring time is preferably at least 12 hours. A stirring time of shorter than 12 hours is insufficient for particles of the co-precipitate to grow fully, with the risk of forming a fine powder which is highly reactive.

Step S14

The stirring for the predetermined time is followed by filtration and washing in order to recover the co-precipitate. The filtration modes include suction filtration and pressure filtration, from which either one may be selected in consideration of productivity or the like.

The co-precipitate is washed with ultrapure water having an electroconductivity of up to 1 μS/cm. Washing is repeated until the filtrate reaches a conductivity of 5 μS/cm or below. A higher conductivity of the filtrate indicates that ions remain in the co-precipitate, and such residual ions may cause to form a strongly agglomerative powder in the subsequent firing step.

Step S15

Once the conductivity of the filtrate lowers to or below the predetermined level, the co-precipitate is recovered and placed in a dryer at a temperature of at least 70° C. for at least 24 hours for drying. The dry co-precipitate is finely divided or ground to a size of 500 μm or less by a hammer mill, sieve, mortar or the like.

Step S16

The ground co-precipitate is fired. Specifically, the co-precipitate is placed in a vessel of refractory oxide, typically yttoria or alumina, where it is fired in an oxygen atmosphere by heating at a temperature of preferably 1,000° C. to 1,400° C., more preferably 1,100° C. to 1,300° C. A firing temperature below 1,000° C. is insufficient for the crystal structure of the fired powder to be the garnet structure. A firing temperature in excess of 1,400° C. causes primary particles of the fired powder to grow too large and become strongly agglomerative, and so the resulting powder is unsuited for forming transparent ceramic materials.

The firing time may be at least 1 hour while the heating rate preferably ranges from 100° C./hr to 500° C./hr. Exemplary firing devices include vertical muffle furnace, horizontal tube furnace, and rotary kiln. The firing device is not particularly limited as long as it is capable of heating at the desired temperature and oxygen flow. If oxygen is not fully fed into the refractory vessel charged with the ground co-precipitate, uneven firing occurs. Thus, means for uniform delivery of oxygen is necessary, for example, the refractory vessel is perforated with pores for air passage.

In this way, there is obtained the sinterable garnet-structure complex oxide powder according to the invention. At this point, the garnet-structure complex oxide powder preferably has a primary particle size of from 70 nm to 300 nm.

Since the fired powder contains primary particles in a necking state, the powder may be subjected to wet pulverizing treatment. Exemplary of the wet pulverizing treatment are milling on a ball mill, bead mill or jet mill and ultrasonication. The pulverization is not particularly limited as long gas any aggregates can be dispersed to primary particles. On use of a ball mill, the preferred medium is balls of alumina (common to the raw material) or resins.

Embodiment 2

In Embodiment 2 of the complex oxide powder preparing method, the aqueous solution containing component (a) and the aqueous solution containing component (b) are added together to the co-precipitating aqueous solution, the resulting solution is stirred as a first stirring step, the aqueous solution containing component (c) is added thereto, and the resulting solution is further stirred as a second stirring step to establish a co-precipitated state of components (a), (b) and (c).

Figure 2:
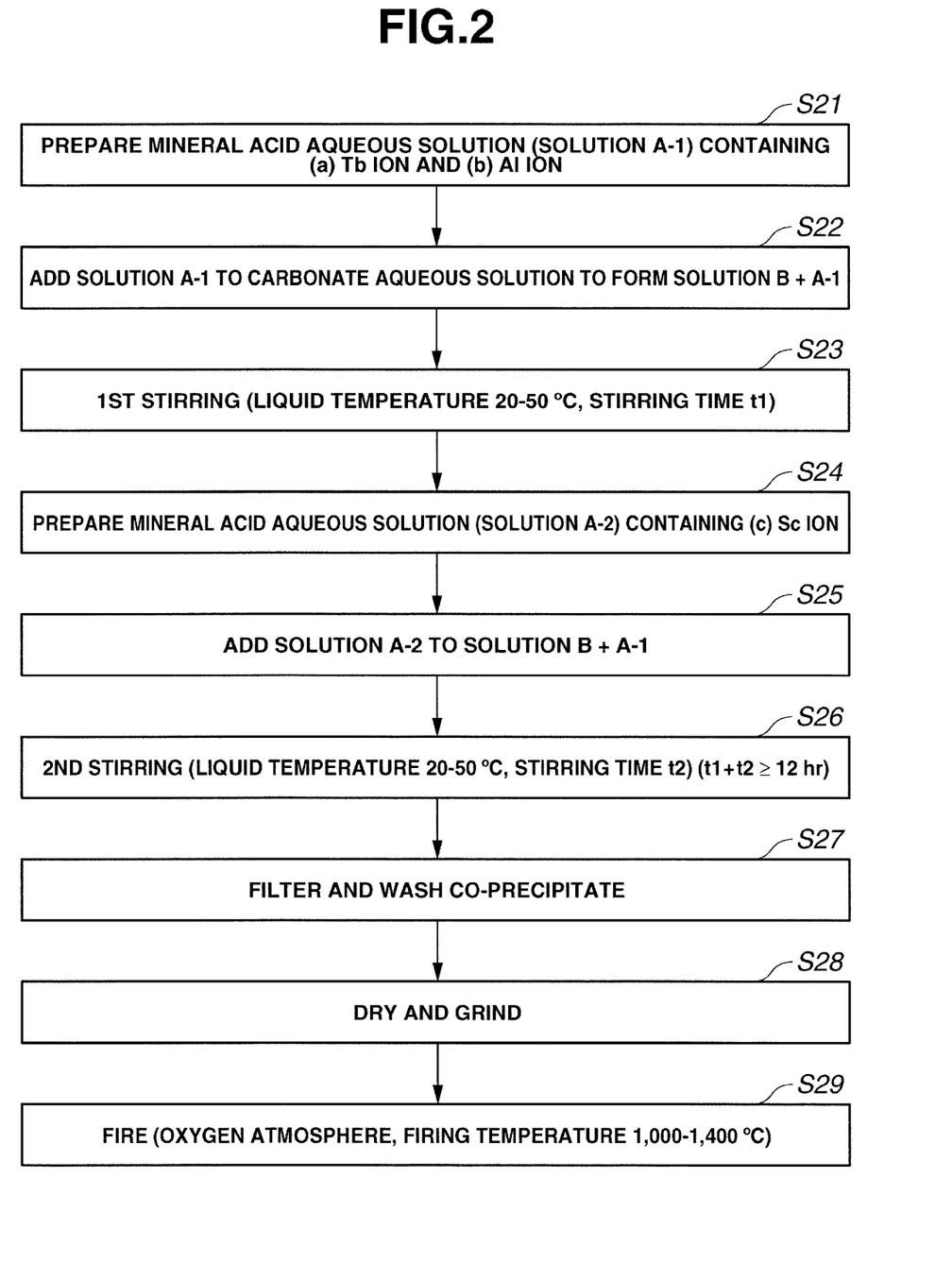
FIG. 2 is a flow chart illustrating steps of Embodiment 2 of the method for preparing a sinterable garnet-structure complex oxide powder according to the invention.

FIG. 2 shows steps in the procedure of Embodiment 2 while referring to an example where R is terbium and A is aluminum.

Step S21

A mineral acid aqueous solution (Solution A-1) containing (a) Tb ion and (b) Al ion is prepared.

Specifically, the aqueous solution containing component (a) and the aqueous solution containing component (b) are independently furnished as in Embodiment 1.

Next, the aqueous solution containing component (a) and the aqueous solution containing component (b) are accurately weighed so as to achieve the desired composition or molar fraction of formula (1), in consideration of subsequent addition of the aqueous solution containing component (c), and mixed with thorough stirring to form a mineral acid aqueous solution (Solution A-1) containing (a) Tb ion and (b) Al ion.

Alternatively, the mineral acid aqueous solution (Solution A-1) containing (a) Tb ion and (b) Al ion may be obtained by weighing the raw material for component (a) and the raw material for component (b) so as to achieve the desired composition or molar fraction of formula (1), mixing them together, and dissolving the powder mixture in a mineral acid aqueous solution, or by sequentially dissolving the raw materials in a mineral acid aqueous solution, Step S21 is complete at this point.

Step S22

Solution A-1 is added to a co-precipitating aqueous solution (Solution B). The co-precipitating aqueous solution used herein may be the same as in Embodiment 1.

The mode of adding Solution A-1 may be the same as in Embodiment 1. That is, Solution A-1 is preferably added dropwise to a co-precipitating aqueous solution (Solution B), more preferably added dropwise with stirring.

After the (dropwise) addition of Solution A-1, the resulting liquid (Solution B+A-1) preferably has a pH value of from 6.1 to less than 7.0, more preferably from 6.1 to less than 6.6.

The amount of the co-precipitating aqueous solution (Solution B) is preferably adjusted such that the solution reaches in the above range of the pH value at the completion of dropwise addition.

Step S23

After Solution A-1 is added to Solution B, the liquid (Solution B+A-1) is stirred. Once Solution A-1 is added to Solution B, a white precipitate which is a co-precipitate of components (a) and (b) forms. Thorough stirring is performed as a first stirring step so that precipitation of components (a) and (b) may not be non-uniform.

The first stirring step includes stirring the co-precipitating aqueous solution having Solution A-1 added thereto (Solution B+A-1) by a rotor at a rotational speed of at least 200 rpm while the solution is kept in a water bath at a temperature of from 20° C. to 50° C. As long as the stirring (rotational) speed is at least 200 rpm, the speed is not particularly limited. Stirring is continued even after Solution A-1 is added in entirety. The time t1 of the first stirring step is preferably at least 1 hour, more preferably at least 4 hours.

Step S24

Next, a mineral acid aqueous solution (Solution A-2) containing (c) Sc ion is furnished. Solution A-2 may be prepared as in Embodiment 1. The amount of the aqueous solution (Solution A-2) containing component (c) to be added is determined so as to correspond to the composition or molar fraction of formula (1).

Step S25

To Solution B having Solution A-1 added thereto (Solution B+A-1), the aqueous solution (Solution A-2) containing component (c) is added. Solution A-2 is preferably added dropwise to a co-precipitating aqueous solution (Solution B+A-1), more preferably added dropwise with stirring.

The dropwise addition of the aqueous solution (Solution A-2) containing component (c) or Sc ion may be performed at the same time as the dropwise addition of Solution A-1 to Solution B, or at an intermediate point of time before the completion of the dropwise addition, or after some time from the completion of the dropwise addition. Sc ions are likely to form an acicular carbonate salt in the presence of carbonate ions, whereas Tb ions or Al ions form a spherical hydroxide in the presence of carbonate ions. The precipitates of the former and the latter are of substantially different structures, with a propensity that the distribution of Sc in the co-precipitate becomes non-uniform. When it is desired that Sc be uniformly distributed in the co-precipitate as well as Tb and Al, the preferred procedure involves previously adding Solution A-1 (aqueous solution containing Tb ion and Al ion) dropwise to Solution B, stirring the liquid for some time, and adding Solution A-2 (aqueous solution containing Sc ion) dropwise after some or all carbonate ions have been eliminated.

After the (dropwise) addition of Solution A-2, the resulting liquid (Solution B+A-1+A-2) preferably has a pH value of from 5.8 to less than 6.6, more preferably from 6.1 to less than 6.6. In this case, a uniform precipitate having the desired composition is obtained.

Step S26

After Solution A-2 is added to Solution B+A-1, the resulting liquid B+A-1+A-2 is stirred as a second stirring step. The second stirring step is such that precipitation of component (c) may not be non-uniform.

The second stirring step includes stirring the co-precipitating aqueous solution having Solution A-2 further added thereto (Solution B+A-1+A-2) by a rotor at a rotational speed of at least 200 rpm while the solution is kept in a water bath at a temperature of from 20° C. to 50° C. As long as the stirring (rotational) speed is at least 200 rpm, the speed is not particularly limited. Stirring is continued even after Solution A-2 is added in entirety. The time t2 of the second stirring step is preferably at least 4 hours, more preferably at least 12 hours.

The total time (t1+t2) of the first and second stirring steps is preferably at least 12 hours. A total stirring time of shorter than 12 hours is insufficient for particles of the co-precipitate to grow fully, with the risk of forming a fine powder which is highly reactive.

Step S27

The second stirring step is followed by filtration and washing in order to recover the co-precipitate. The methods and conditions of filtration and washing may be the same as in Embodiment 1.

Step S28

Once the conductivity of the filtrate lowers to or below the predetermined level, the co-precipitate is recovered and placed in a dryer at a temperature of at least 70° C. for at least 24 hours for drying. The dry co-precipitate is finely divided or ground to a size of 500 μm or less by a hammer mill, sieve, mortar or the like.

Step S29

The ground co-precipitate is fired. The firing conditions may be the same as in Embodiment 1.

In this way, there is obtained the sinterable garnet-structure complex oxide powder according to the invention. At this point, the garnet-structure complex oxide powder preferably has a primary particle size of from 70 nm to 300 nm.

Since the fired powder contains primary particles in a necking state, the power may be subjected to wet pulverizing treatment. Exemplary of the wet pulverizing treatment are milling on a ball mill, bead mill or jet mill and ultrasonication. The pulverization is not particularly limited as long as any aggregates can be dispersed to primary particles. On use of a ball mill, the preferred medium is balls of alumina (common to the raw material) or resins.

Manufacture of Transparent Ceramic Material

The invention also provides a method for manufacturing a transparent ceramic material comprising the steps of molding the garnet-structure complex oxide powder prepared by the inventive method into a compact, sintering the compact, and pressure sintering the compact.

Source Powder

To the source powder comprising the garnet-structure complex oxide powder obtained as above, various organic additives may be added for the purposes of increasing quality consistency and yield in the subsequent ceramic manufacturing process. The additives are not particularly limited and may be selected from dispersants, binders, lubricants, plasticizers, and the like. The organic additive of high purity, i.e., free of unnecessary metal ions is preferably selected.

For example, the fired powder is dispersed in a lower ($C_1$-$C_3$) alcohol solvent to form a slurry. At this point, organic additives such as dispersant and binder may be added for achieving stable dispersion, peptization, and shape retention. The organic additives are not particularly limited as long as they achieve the desired physical properties and are compatible with the alcohol solvent. The time taken until the slurry is formed is not particularly limited and is preferably determined by confirming that the powder is dispersed to primary particles as measured by a particle size distribution measuring system.

Manufacturing Procedure

According to the invention, a sintered body is prepared by using the source powder mentioned above, press molding the powder into a compact of predetermined shape, burning-out, and sintering the compact into a sintered body which is consolidated to a relative density of at least 95%. This is preferably followed by hot isostatic pressing (HIP) treatment as the post treatment. If the sintered body is directly subjected to HIP treatment, paramagnetic garnet-structure transparent ceramic is reduced to develop at least 0.1% of oxygen vacancies. Therefore, preferably weak oxidizing HIP treatment is performed, or HIP treatment is followed by the final high-temperature treatment in an oxidizing atmosphere, as an annealing treatment for oxygen vacancy recovery. This controls the oxygen vacancy below 0.1% as determined from the difference between the actual density and the theory density of transparent ceramic material.

Molding

The molding method is generally divided into two, wet and dry methods. If the molding method is finely divided, several sub-methods are available, but such fine division is meaningless to the invention. In the case of wet method, cast molding is typical. Specifically, the slurry is cast into a gypsum mold and dried into a compact. In the case of dry method, uniaxial press molding is typical. Specifically, the slurry is spray dried or otherwise granulated, and the granules are pressed in a mold to form a compact. The compact is then subjected to cold isostatic pressing (CIP) treatment wherein the compact received tightly in a deformable waterproof container is pressed under hydrostatic pressure, for thereby consolidating the compact to a higher density. Since the state of a slurry differs with a particular molding method, it is important that the concentration of a slurry and the type and amount of organic additives are controlled in the slurry-forming step so that a slurry with appropriate physical properties is obtainable.

Burn-Out

Since the compact contains organic additives, burnout treatment must be performed to remove the organic matter. The compact is placed in a muffle furnace where it is heat treated in air at a temperature of up to 1,000° C. (not higher than the firing temperature). The lower limit of the burnout temperature is not critical as long as the organic matter is burned out. The burnout of organic matter may be confirmed by differential thermal analysis (TG/DTA) of a sample obtained by grinding the compact. The holding time of burnout treatment is not particularly limited as long as the burnout of organic matter is completed. The heating rate is preferably up to 300° C./hr because on rapid heating, the decomposition of organic matter quickly starts and cracks are formed by degassing.

Sintering

The compact after burnout is sintered into a transparent oxide ceramic material. The sintering atmosphere is selected from vacuum, oxygen and air, with the oxygen atmosphere is most preferred for suppressing the occurrence of oxygen vacancies. The sintering temperature is not particularly limited as long as the desired sintered density is obtained. The sintering temperature is preferably from 1,600° C. to 1,800° C., more preferably from 1,700° C. to 1,750° C. A sintering temperature in the range is preferred because precipitation of a heterogeneous phase is minimized. A holding time of several hours may suffice for the sintering step although the sintered body must be consolidated to a relative density of at least 95%. It is more preferable to hold the compact at the sintering temperature for a time of at least 10 hours to consolidate the compact to a relative density of at least 99%. Then final transparency is further improved. The sintering conditions are not particularly limited as long as the material transparentizes. For example, the compact may be heated at a rate of 100° C./hr and held at 1,700° C. for 20 hours. Since the peritectic region appears at 1,840° C. or higher, the compact must be treated at a temperature of lower than 1,840° C.

HIP

In the inventive method, the sintering step is preferably followed by hot isostatic pressing (HIP) treatment.

The HIP treatment uses a pressure medium which is selected from argon, argon-hydrogen, and oxygen, depending on the material of a heater and the treatment temperature. The pressure applied by the pressure medium is preferably 50 to 300 MPa, more preferably 100 to 300 MPa. A pressure of less than 50 MPa may fail to exert a transparency-improving effect. If the pressure is increased beyond 300 MPa, no further transparency-improving effect is obtained, and an excessive load must be applied to the system, causing damages. A pressure of up to 196 MPa is preferably applied because a pressure of such order is manageable by a commercial HIP system.

The treatment temperature or holding temperature is not particularly limited as long as it is below the peritectic point and transparency is achievable, as in the sintering step. For example, the treatment temperature is set in the range of 1,000° C. to 1,800° C., preferably 1,100° C. to 1,700° C. Although the holding time at the treatment temperature is not particularly limited, it is typically in the range of 1 to 3 hours because a longer holding time can increase the risk of oxygen vacancy formation.

For the HIP treatment, the sintered body is placed in a case of high-melting metal such as molybdenum, tungsten or platinum, or a case of high-melting oxide such as yttria or alumina, to block various gas components emitted from the heater.

Anneal

After the HIP treatment in the inventive method, sometimes oxygen vacancies form in the transparent ceramic sintered body to give a faintly gray outer appearance. In such a case, oxygen annealing treatment (oxygen vacancy recovery treatment) is preferably carried out in an oxygen atmosphere at a temperature below the HIP treatment temperature, typically 1,200 to 1,500° C. Although the holding time of annealing treatment is not particularly limited, it is preferably selected in the range from a duration sufficient to recover oxygen vacancies to a duration shorter than a wastefully long time to increase the cost of electric consumption.

The oxygen annealing treatment converts the transparent ceramic sintered body having a faintly gray outer appearance as a result of the HIP treatment to a colorless transparent paramagnetic garnet-structure ceramic body in which the occurrence of oxygen vacancies is limited below 0.1%.

Optical Polishing

The paramagnetic garnet-structure transparent ceramic body manufactured through the series of steps as mentioned above is preferably subjected to optical polishing on both end surfaces on an optical axis of utilization. The optical surface accuracy is preferably up to $\lambda/8$, more preferably up to $\lambda/10$, provided the measurement wavelength $\lambda=633$ nm. If desired, an antireflective film may be deposited on the optically polished surface to further reduce the optical loss.

Magnetooptical Device

The transparent ceramic material obtained by the manufacturing method is best suited for magnetooptical devices, especially a Faraday rotator for an optical isolator at a wavelength of 0.9 to 1.1 μm.

Figure 3:
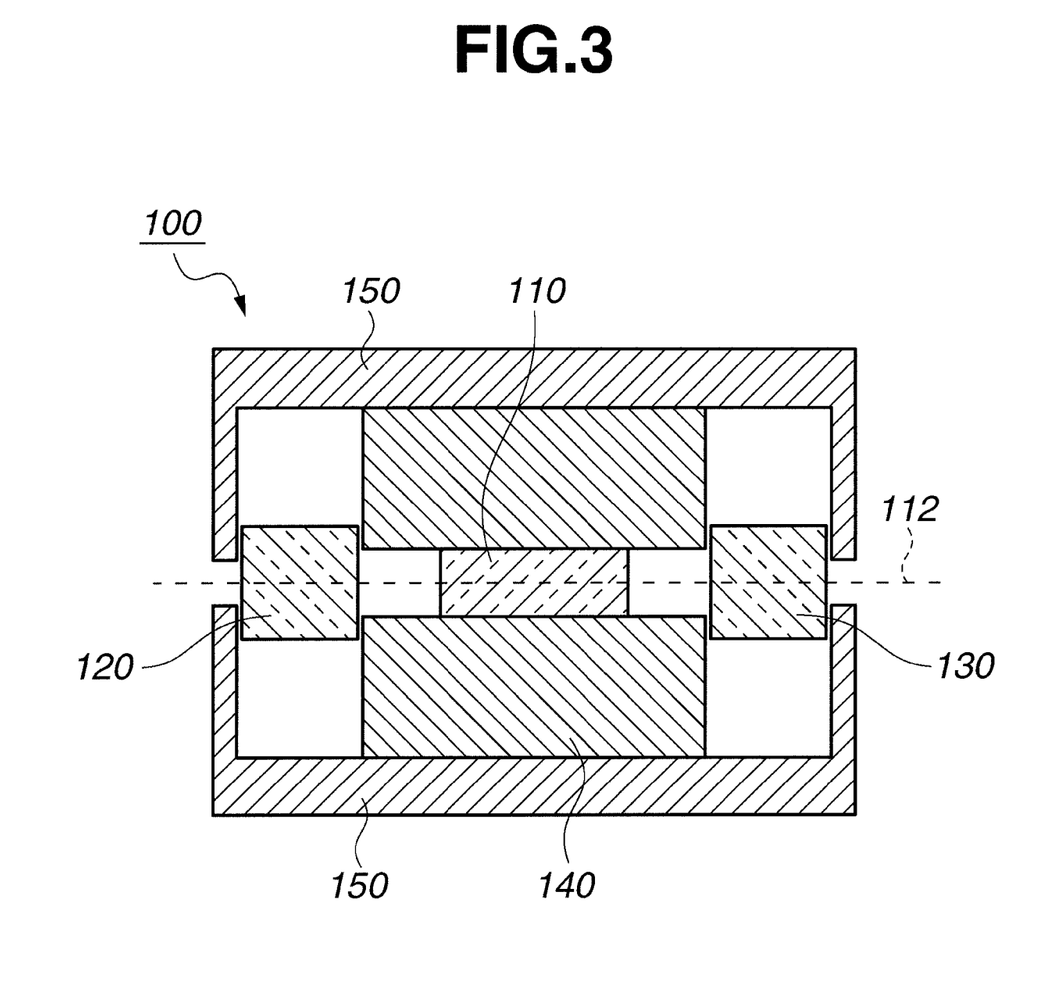
FIG. 3 is a schematic cross-sectional view of an optical isolator using a Faraday rotator made of a transparent ceramic material according to the invention.

FIG. 3 is a schematic cross-sectional view showing one exemplary optical isolator which is an optical device having as an optical component, a Faraday rotator made of the transparent ceramic material obtained by the manufacturing method. In FIG. 3, the optical isolator 100 comprises a Faraday rotator 110 made of the transparent ceramic material obtained by the manufacturing method, a polarizer 120 and an analyzer 130 of polarizing material arranged upstream and downstream of the Faraday rotator 110. In the optical isolator 100, polarizer 120, Faraday rotator 110 and analyzer 130 are arranged on an optical axis 112 in the order of 120-110-130, and preferably, a magnet 140 is rested on at least one side surface of those components. The magnet 140 is preferably received in a housing 150.

The optical isolator 100 is advantageously used in an industrial fiber laser system. The isolator is adequate for preventing the laser light emitted by a laser light source from being reflected back to the light source to make its oscillation unstable.

EXAMPLE

Examples and Comparative Examples are given below for further illustrating the invention although the invention is not limited thereto.

Example 1

A sinterable garnet-structure complex oxide powder was prepared in accordance with Embodiment 1 of the inventive method for preparing a sinterable garnet-structure complex oxide powder.

Raw materials, terbium oxide powder (purity 99.999%, Shin-Etsu Chemical Co., Ltd.), aluminum hydroxide powder (purity 99.999%, Nippon Light Metal Co., Ltd.), and scandium oxide powder (purity 99.9%, Shin-Etsu Chemical Co., Ltd.) were separately dissolved in 2N nitric acid aqueous solutions (Kanto Chemical Inc.). The amounts of powders added were adjusted such that the solutions had a concentration of 2M. In this way, (a) Tb ion-containing aqueous solution, (b) Al ion-containing aqueous solution, and (c) Sc ion-containing aqueous solution were obtained.

These aqueous solutions were mixed so as to give the molar compositional ratio shown in Table 1. With heating and stirring, the mixture was added dropwise to an aqueous solution (referred to as a carbonate aqueous solution) of 2M ammonium hydrogencarbonate (Kanto Chemical Inc.) and 0.004M ammonium sulfate (Kanto Chemical Inc.). The dropwise addition conditions included a water bath temperature of 30° C. and a stirring speed of 300 rpm. The amount of the carbonate aqueous solution was adjusted such that the solution reached pH 6.3 at the completion of dropwise addition. After the completion of dropwise addition, the liquid in which a white precipitate formed was stirred for 24 hours.

The white precipitate was collected on a paper filter and washed with ultrapure water by suction filtration. Water washing was repeated until the filtrate reached a conductivity of 5 μS/cm or below. The white precipitate recovered was dried on a dryer at 80° C. for 2 days whereupon the water content of the precipitate was reduced to 1% by weight or lower. The dry white precipitate was placed in a vertical muffle furnace and fired at 1,200° C. in an oxygen atmosphere, yielding a fired powder.

XRD Analysis

Powder X-ray diffraction analysis (XRD) was carried out to confirm that the fired powder assumed a garnet structure. Using X-ray diffractometer SmartLab (Rigaku Corp.), measurement was made over 2θ=10° to 90°. The XRD data thus obtained were compared with the past reference data to see whether a garnet phase or perovskite phase was present. When only diffraction peaks assigned to the garnet phase appear, it is believed that the inclusion of perovskite phase is less than 1%, and this sample is regarded a single garnet phase.

Primary Particle Size Measurement

The primary particle size of the fired powder was measured using a field emission scanning electron microscope (FE-SEM). A carbon tape was attached onto the stage, the powder was sprayed over the tape, and gold evaporation was performed in order to avoid any electric charge-up. More than 100 primary particles were extracted from several FE-SEM photos, and the size of all particles was measured. The average value is reported as primary particle size.

The results are shown in Table 1.

TABLE 1

| | | Stirring treatment | | Firing treatment | Measurement results | |
|---|---|---|---|---|---|---|
| | Composition | Liquid temp. (° C.) | Stirring time (h) | Firing temp. (° C.) | XRD analysis | Primary particle size (μm) |
| Example 1-1 | $(Tb_{0.996}Sc_{0.004})_3(Al_{0.97}Sc_{0.03})_5O_{12}$ | 30 | 24 | 1,200 | garnet | 120 |
| Example 1-2 | $(Tb_{0.992}Sc_{0.008})_3(Al_{0.95}Sc_{0.05})_5O_{12}$ | 30 | 24 | 1,200 | garnet | 120 |
| Example 1-3 | $(Tb_{0.991}Sc_{0.009})_3(Al_{0.93}Sc_{0.07})_5O_{12}$ | 30 | 24 | 1,200 | garnet | 120 |
| Example 1-4 | $(Tb_{0.981}Sc_{0.019})_3(Al_{0.85}Sc_{0.15})_5O_{12}$ | 30 | 24 | 1,200 | garnet | 120 |
| Example 1-5 | $(Tb_{0.985}Sc_{0.015})_3(Al_{0.97}Sc_{0.03})_5O_{12}$ | 30 | 24 | 1,200 | garnet | 120 |
| Comparative Example 1-1 | $(Tb)_3(Al_{0.996}Sc_{0.004})_5O_{12}$ | 30 | 24 | 1,200 | garnet + perovskite | 120 |
| Comparative Example 1-2 | $(Tb)_3(Al)_5O_{12}$ | 30 | 24 | 1,200 | garnet + perovskite | 120 |
| Comparative Example 1-3 | $(Tb_{0.91}Sc_{0.09})_3(Al_{0.8}Sc_{0.2})_5O_{12}$ | 30 | 24 | 1,200 | garnet + perovskite | 120 |

The fired powder was placed in a resin pot. The pot was further charged with high purity ethanol (Kanto Chemical Inc.), polyethylene glycol (PEG200, Kanto Chemical Inc.) as dispersant, vinyl acetate-vinyl alcohol copolymer (JMR-10L, Japan Vam & Poval Co., Ltd.) as binder, 1,000 ppm of tetraethyl orthosilicate (TEOS) as sintering aid, and resin balls as milling media. After the pot was closed, the ball mill was operated at a rotational speed of 200 rpm. After ball milling, the slurry was granulated by a spray dryer. This was followed by monoaxial press molding and CIP molding, obtaining a compact of diameter 10 mm and length 20 mm having a relative density of 54%.

The compact was subjected to binder burnout at 800° C. for the purpose of removing the binder and organic components in the compact. Subsequently, the compact (after burnout) was placed in an oxygen atmosphere furnace where it was sintered at 1,700° C. for 20 hours. Although the sintered body had high transparency at this point of time, it was subjected to HIP treatment under conditions including argon blanket, 198 MPa, 1,600° C., and 3 hours for further enhancing transparency. The sintered body was annealed in an oxygen atmosphere at 1,400° C. for the purpose of removing oxygen defects resulting from sintering or the like.

The transparent sintered body thus obtained was machined and polished into a sample of diameter 5 mm and length 15 mm. By optical polishing of opposite end surfaces of the sample, the optical surface had a surface accuracy of at least $\lambda/8$ ($\lambda=633$ nm).

Evaluation

The sample was evaluated for optical properties (total luminous transmittance, Verdet constant, extinction ratio).

Total Luminous Transmittance

The total luminous transmittance between the optically polished surfaces of the transparent sintered body having a length of 15 mm was measured according to JIS K7105 (ISO 13468-2:1999).

An integrating sphere is fitted with entrance and exit ports for light passage. A sample is placed at the entrance port and a reflector is attached to the exit port. Then all light emerging from the sample is detectable by the integrating sphere. A transmittance is determined from a ratio of the intensity of emergent light detected to the intensity of incident light to the sample. For analysis, a spectrometer (V-670 by JASCO Corp.) equipped with an integrating sphere is used. The sphere is provided with a pinhole such that light is irradiated to define a spot with diameter 3 mm. Using a halogen lamp as the light source, and a photomultiplier tube (wavelength less than 750 nm) and a PbS photoemissive cell (wavelength at least 750 nm) as the detector, measurement is performed on a double-beam basis. The total luminous transmittance is a value at wavelength 1,064 nm. The total luminous transmittance is measured on five samples, with the number of significant figures being 2 and unit in percent.

Verdet Constant

As shown in FIG. 3, a sintered body sample is inserted into a center bore of a neodymium-iron-boron magnet of outer diameter 32 mm, inner diameter 6 mm, and length 40 mm, and polarizers are placed at both ends. By using a high-power laser (beam diameter 1.6 mm, IPG Photonics Japan Co., Ltd.), and letting a high-power laser beam of wavelength 1,064 nm enter both the end surfaces, a Faraday rotation angle θ is determined. The Faraday rotation angle θ is an angle at which the maximum transmittance is obtained when the polarizer on the emergent side is rotated.

Verdet constant V is determined from the following equation. The magnetic flux density (B) applied to the sample is computed by simulation from the shape and size of the measurement system, residual magnet flux density (Br), and coercive force (He).

$$\theta = V \times B \times L,$$

Herein θ is a Faraday rotation angle (Rad), V is a Verdet constant (Rad/(T·m)), B is a magnetic flux density (T), and L is the length of the Faraday rotator (=0.015 m in this example).

Extinction Ratio

An extinction ratio was measured according to JIS C5877-2:2012 by an optical system having a laser light source (NKT Photonics Co., Ltd.) combined with a power meter (Gentec E-O), a Ge photodetector (Gentec E-O), and polarizers (Sigma Co., Ltd.). The laser beam used had a wavelength 1,064 nm and a beam diameter of 1 to 3 mm. Measurement was at room temperature 24° C.

In the system without a sample, two polarizers are rotated, they are fixed at the positions at which the power of light becomes maximum, and the power of light $P_{//}$ is measured. Thereafter, a sample is inserted between two polarizers, the polarizer (analyzer) on the detector side is rotated 90°, and the power of light $P_\perp$ at the crossed Nicols is measured. The extinction ratio (dB) is determined according to the following equation.

$$\text{Extinction ratio (dB)} = 10 \log_{10}(P_{//}/P_\perp)$$

The overall evaluation of a sample is as follows. It is noted that a total luminous transmittance of at least 83% is especially preferred for the high output isolator material. A sample having a total luminous transmittance of at least 83% and an extinction ratio of at least 40 dB is rated excellent (⊚), a sample having a total luminous transmittance of at least 83% and an extinction ratio of 30 dB to less than 40 dB is rated good (○), a sample having a total luminous transmittance of 75% to less than 83% and an extinction ratio of less than 30 dB is rated mediocre (Δ), and a sample having a total luminous transmittance of less than 75% and an extinction ratio of less than 30 dB is rated poor (X).

The results are summarized in Table 2.

TABLE 2

| | | Evaluation results | | | |
| --- | --- | --- | --- | --- | --- |
| | Composition | Total luminous transmittance @ 1,064 nm (%) | Verdet constant (Rad/T·m) | Extinction ratio (dB) | Overall evaluation |
| Example 1-1 | $(Tb_{0.996}Sc_{0.004})_3(Al_{0.97}Sc_{0.03})_5O_{12}$ | 83.4 | 60 | 34 | ○ |
| Example 1-2 | $(Tb_{0.992}Sc_{0.008})_3(Al_{0.95}Sc_{0.05})_5O_{12}$ | 83.1 | 60 | 36 | ○ |

TABLE 2-continued

|  | Composition | Evaluation results | | | |
|---|---|---|---|---|---|
| | | Total luminous transmittance @ 1,064 nm (%) | Verdet constant (Rad/T·m) | Extinction ratio (dB) | Overall evaluation |
| Example 1-3 | $(Tb_{0.991}Sc_{0.009})_3(Al_{0.93}Sc_{0.07})_5O_{12}$ | 83.6 | 60 | 35 | ○ |
| Example 1-4 | $(Tb_{0.981}Sc_{0.019})_3(Al_{0.85}Sc_{0.15})_5O_{12}$ | 83.7 | 59 | 33 | ○ |
| Example 1-5 | $(Tb_{0.985}Sc_{0.015})_3(Al_{0.97}Sc_{0.03})_5O_{12}$ | 83.2 | 59 | 31 | ○ |
| Comparative Example 1-1 | $(Tb)_3(Al_{0.996}Sc_{0.004})_5O_{12}$ | 74.4 | 60 | 26 | X |
| Comparative Example 1-2 | $(Tb)_3(Al)_5O_{12}$ | 73.8 | 60 | 29 | X |
| Comparative Example 1-3 | $(Tb_{0.91}Sc_{0.09})_3(Al_{0.8}Sc_{0.02})_5O_{12}$ | 72.4 | 56 | 20 | X |

For each of the compositions of Examples 1-1 to 1-5, the crystal structure of the fired powder is a 100% garnet structure, and the sintered body manufactured from the fired powder has a high total luminous transmittance of at least 83%. In Comparative Examples 1-1 to 1-3, a crystal phase other than garnet, that is, perovskite phase develops in the crystal structure of the fired powder, and the sintered body is less light transmissive. This is probably because the precipitated perovskite phase does not extinguish during the post-sintering steps and eventually becomes a light scattering source.

The sintered body meeting a compositional ratio of formula (1) according to the invention offers a high total luminous transmittance. The sintered bodies of Examples 1-1 to 1-5 have a Verdet constant of 59 to 60 Rad/T·m, which is 1.5 times greater than the conventional material TGG.

Example 2

A sinterable garnet-structure complex oxide powder was prepared in accordance with Embodiment 2 of the inventive method for preparing a sinterable garnet-structure complex oxide powder.

The complex oxide powder was prepared by the same procedure as in Example 1 except that a mixture of an aqueous solution containing (a) Tb ion and an aqueous solution containing (b) Al ion was added dropwise to an aqueous solution of ammonium hydrogencarbonate, the mixture was heated and stirred for some time, an aqueous solution containing (c) Sc ion was added dropwise thereto, and the mixture was heated and stirred again.

Specifically, the same raw materials (terbium oxide and aluminum hydroxide) as in Example 1 were separately dissolved in 2N nitric acid aqueous solutions (Kanto Chemical Inc.). The amounts of powders added were adjusted such that the solutions had a concentration of 2M. In this way, (a) Tb ion-containing aqueous solution and (b) Al ion-containing aqueous solution were obtained. Next, these aqueous solutions were mixed so as to eventually give the molar compositional ratio shown in Table 2. With heating and stirring, the mixture was added dropwise to an aqueous solution (referred to as a carbonate aqueous solution) of 2M ammonium hydrogencarbonate (Kanto Chemical Inc.) and 0.004M ammonium sulfate (Kanto Chemical Inc.). The dropwise addition conditions included a water bath temperature of 30° C. and a stirring speed of 300 rpm. The amount of the carbonate aqueous solution was adjusted such that the solution reached pH 6.3 at the completion of dropwise addition. After the completion of dropwise addition, the liquid in which a white precipitate formed was stirred for a time t1.

The same raw material (scandium oxide) as in Example 1 was dissolved in a 2N nitric acid aqueous solution (Kanto Chemical Inc.). The amount of powder added was adjusted such as to give a concentration of 2M. In this way, (c) Sc ion-containing aqueous solution was obtained. With heating and stirring, the aqueous solution was added dropwise to the above mixture so as to eventually give the molar compositional ratio shown in Table 2. The dropwise addition conditions included a water bath temperature of 30° C. and a stirring speed of 300 rpm. The solution reached pH 6.1 at the completion of dropwise addition. After the dropwise addition of the aqueous solution of component (c), the liquid in which a white precipitate formed was stirred for a time t2.

The white precipitate was collected on a paper filter and washed with ultrapure water by suction filtration. Water washing was repeated until the filtrate reached a conductivity of 5 µS/cm or below. The recovered white precipitate was dried on a dryer at 80° C. for 2 days whereupon the water content of the precipitate was reduced to 1% by weight or lower. The dry white precipitate was placed in a vertical muffle furnace and fired at 1,200° C. in an oxygen atmosphere, yielding a fired powder.

As in Example 1, the fired powder was examined by XRD analysis and primary particle size measurement, with the results shown in Table 3.

TABLE 3

| | Composition | 1st stirring Liquid temp. (° C.) | 1st stirring Stirring time t1 (h) | 2nd stirring Liquid temp. (° C.) | 2nd stirring Stirring time t2 (h) | Firing treatment Firing temp. (° C.) | Measurement results XRD analysis | Measurement results Primary particle size (μm) |
|---|---|---|---|---|---|---|---|---|
| Example 2-1 | $(Tb_{0.996}Sc_{0.004})_3(Al_{0.97}Sc_{0.03})_5O_{12}$ | 30 | 1 | 30 | 23 | 1,200 | garnet | 100 |
| Example 2-2 | $(Tb_{0.996}Sc_{0.004})_3(Al_{0.97}Sc_{0.03})_5O_{12}$ | 30 | 12 | 30 | 12 | 1,200 | garnet | 120 |
| Example 2-3 | $(Tb_{0.996}Sc_{0.004})_3(Al_{0.97}Sc_{0.03})_5O_{12}$ | 30 | 20 | 30 | 4 | 1,200 | garnet | 110 |
| Example 2-4 | $(Tb_{0.996}Sc_{0.004})_3(Al_{0.97}Sc_{0.03})_5O_{12}$ | 30 | 4 | 30 | 20 | 1,200 | garnet | 130 |
| Example 2-5 | $(Tb_{0.996}Sc_{0.004})_3(Al_{0.97}Sc_{0.03})_5O_{12}$ | 30 | 4 | 30 | 20 | 1,200 | garnet | 120 |
| Example 2-6 | $(Tb_{0.991}Sc_{0.009})_3(Al_{0.93}Sc_{0.07})_5O_{12}$ | 30 | 4 | 30 | 20 | 1,200 | garnet | 120 |
| Example 2-7 | $(Tb_{0.981}Sc_{0.019})_3(Al_{0.85}Sc_{0.15})_5O_{12}$ | 30 | 4 | 30 | 20 | 1,200 | garnet | 120 |
| Example 2-8 | $(Tb_{0.985}Sc_{0.015})_3(Al_{0.97}Sc_{0.03})_5O_{12}$ | 30 | 4 | 30 | 20 | 1,200 | garnet | 120 |
| Comparative Example 2 | $(Tb)_3(Al_{0.996}Sc_{0.004})_5O_{12}$ | 30 | 4 | 30 | 20 | 1,200 | garnet + perovskite | 120 |

Under the same conditions as in Example 1, a sinterable source powder was prepared from the fired powder, and a CIP compact was prepared therefrom. This was followed by binder burnout, sintering, HIP, and oxidative anneal treatment under the same conditions as in Example 1 to form a transparent sintered body. The sintered body was machined and polished.

The sample was evaluated for optical properties (total luminous transmittance, Verdet constant, extinction ratio) as in Example 1.

The results are summarized in Table 4.

TABLE 4

| | Composition | Evaluation results Total luminous transmittance @ 1,064 nm (%) | Evaluation results Verdet constant (Rad/T · m) | Evaluation results Extinction ratio (dB) | Evaluation results Overall evaluation |
|---|---|---|---|---|---|
| Example 2-1 | $(Tb_{0.996}Sc_{0.004})_3(Al_{0.97}Sc_{0.03})_5O_{12}$ | 83.1 | 60 | 42 | ⊚ |
| Example 2-2 | $(Tb_{0.996}Sc_{0.004})_3(Al_{0.97}Sc_{0.03})_5O_{12}$ | 83.6 | 60 | 45 | ⊚ |
| Example 2-3 | $(Tb_{0.996}Sc_{0.004})_3(Al_{0.97}Sc_{0.03})_5O_{12}$ | 83.5 | 60 | 48 | ⊚ |
| Example 2-4 | $(Tb_{0.996}Sc_{0.004})_3(Al_{0.97}Sc_{0.03})_5O_{12}$ | 83.7 | 60 | 44 | ⊚ |
| Example 2-5 | $(Tb_{0.996}Sc_{0.004})_3(Al_{0.97}Sc_{0.03})_5O_{12}$ | 83.7 | 60 | 46 | ⊚ |
| Example 2-6 | $(Tb_{0.991}Sc_{0.009})_3(Al_{0.93}Sc_{0.07})_5O_{12}$ | 83.5 | 60 | 41 | ⊚ |
| Example 2-7 | $(Tb_{0.981}Sc_{0.019})_3(Al_{0.85}Sc_{0.15})_5O_{12}$ | 83.7 | 59 | 42 | ⊚ |
| Example 2-8 | $(Tb_{0.985}Sc_{0.015})_3(Al_{0.97}Sc_{0.03})_5O_{12}$ | 83.5 | 59 | 46 | ⊚ |
| Comparative Example 2 | $(Tb)_3(Al_{0.996}Sc_{0.004})_5O_{12}$ | 72.7 | 60 | 26 | X |

As is evident from the results, the fired powders resulting from a total stirring time of at least 12 hours are composed of primary particles having a particle size of about 100 to 120 nm, and the sintered bodies using these fired powders exhibit a better extinction ratio than in Example 1. In contrast to Example 1 wherein aqueous solutions containing three components (a), (b) and (c) are simultaneously added to a co-precipitating aqueous solution and a Sc precursor precipitates as an acicular carbonate salt, Example 2 follows the procedure that aqueous solutions containing two components (a) and (b) are added to a co-precipitating aqueous solution, the carbonate is fully removed from the solution, thereafter a precipitate of Sc precursor forms in the same spherical form of hydroxide as Tb—Al co-precipitate, and the uniformity of Sc precipitation is improved. It is noted that the sintered body from a composition allowing a perovskite phase to develop in the crystal structure as in Comparative Example 2 has poor light transmission.

Example 3

A fired powder was prepared as in Example 2-4 except that the liquid temperatures and stirring times of first and second stirring steps and the sintering temperature were changed. The fired powder was examined by XRD analysis and primary particle size measurement as in Example 1.

For reference purpose, Comparative Example 3-5 of mixing metal oxide powders is described. Namely, terbium oxide ($Tb_4O_7$, particle size 60-100 nm, Shin-Etsu Chemical Co., Ltd.), aluminum oxide (particle size 100 nm, Daimei Chemicals Co., Ltd.), and scandium oxide (particle size 1 μm, Shin-Etsu Chemical Co., Ltd.) were weighed so as to give a molar compositional ratio as shown in Table 5, and placed in a resin pot. The pot was further charged with high purity ethanol (Kanto Chemical Inc.), polyethylene glycol (PEG200, Kanto Chemical Inc.), 1,000 ppm of tetraethyl orthosilicate (TEOS), and resin balls. After the pot was closed, the ball mill was operated. Thereafter, the powder was fired at 1,200° C. The fired powder was examined by XRD analysis and primary particle size measurement as in Example 1.

The results are shown in Table 5.

of crystal particles (primary particle size) is related to the total stirring time of the first and second stirring steps, specifically as the total stirring time is shorter, the primary particle size becomes smaller. A comparison of Examples 3-6 and 3-7 with Comparative Examples 3-3 and 3-4 reveals that the firing temperature after the stirring treatment also has impact on the size of primary particles. That is, when the

TABLE 5

| | | 1st stirring | | 2nd stirring | | Firing | Measurement results | |
|---|---|---|---|---|---|---|---|---|
| | Composition | Liquid temp. (° C.) | Stirring time t1 (h) | Liquid temp. (° C.) | Stirring time t2 (h) | treatment Firing temp. (° C.) | XRD analysis | Primary particle size (μm) |
| Example 3-1 | $(Tb_{0.996}Sc_{0.004})_3(Al_{0.97}Sc_{0.03})_5O_{12}$ | 20 | 4 | 20 | 20 | 1,200 | garnet | 80 |
| Example 3-2 | $(Tb_{0.996}Sc_{0.004})_3(Al_{0.97}Sc_{0.03})_5O_{12}$ | 40 | 4 | 40 | 20 | 1,200 | garnet | 160 |
| Example 3-3 | $(Tb_{0.996}Sc_{0.004})_3(Al_{0.97}Sc_{0.03})_5O_{12}$ | 50 | 4 | 50 | 20 | 1,200 | garnet | 210 |
| Example 3-4 | $(Tb_{0.996}Sc_{0.004})_3(Al_{0.97}Sc_{0.03})_5O_{12}$ | 30 | 4 | 30 | 8 | 1,200 | garnet | 100 |
| Example 3-5 | $(Tb_{0.996}Sc_{0.004})_3(Al_{0.97}Sc_{0.03})_5O_{12}$ | 30 | 12 | 30 | 36 | 1,200 | garnet | 140 |
| Example 3-6 | $(Tb_{0.996}Sc_{0.004})_3(Al_{0.97}Sc_{0.03})_5O_{12}$ | 30 | 4 | 30 | 20 | 1,000 | garnet | 70 |
| Example 3-7 | $(Tb_{0.996}Sc_{0.004})_3(Al_{0.97}Sc_{0.03})_5O_{12}$ | 30 | 4 | 30 | 20 | 1,400 | garnet | 280 |
| Comparative Example 3-1 | $(Tb_{0.996}Sc_{0.004})_3(Al_{0.97}Sc_{0.03})_5O_{12}$ | 60 | 4 | 60 | 20 | 1,200 | garnet | 340 |
| Comparative Example 3-2 | $(Tb_{0.996}Sc_{0.004})_3(Al_{0.97}Sc_{0.03})_5O_{12}$ | 30 | 1 | 30 | 5 | 1,200 | garnet | 40 |
| Comparative Example 3-3 | $(Tb_{0.996}Sc_{0.004})_3(Al_{0.97}Sc_{0.03})_5O_{12}$ | 30 | 4 | 30 | 20 | 900 | un-identifiable | 45 |
| Comparative Example 3-4 | $(Tb_{0.996}Sc_{0.004})_3(Al_{0.97}Sc_{0.03})_5O_{12}$ | 30 | 4 | 30 | 20 | 1,500 | garnet | 350 |
| Comparative Example 3-5 | $(Tb_{0.996}Sc_{0.004})_3(Al_{0.97}Sc_{0.03})_5O_{12}$ | — | — | — | — | 1,200 | garnet | 130 |

Using the fired powders, transparent sintered bodies were manufactured as in Example 2-4.

The sample was evaluated for optical properties (total luminous transmittance, Verdet constant, extinction ratio) as in Example 1.

The results are summarized in Table 6.

firing temperature is lower than 1,000° C., primary particles are small and no garnet phase is developed (Comparative Example 3-3), and when the firing temperature is higher than 1,400° C., primary particles are very large (Comparative Example 3-4). The result common to these phenomena is that all sintered bodies having high transparency have a

TABLE 6

| | | Evaluation results | | | |
|---|---|---|---|---|---|
| | Composition | Total luminous transmittance @ 1,064 nm (%) | Verdet constant (Rad/T · m) | Extinction ratio (dB) | Overall evaluation |
| Example 3-1 | $(Tb_{0.996}Sc_{0.004})_3(Al_{0.97}Sc_{0.03})_5O_{12}$ | 83.4 | 60 | 46 | ⊚ |
| Example 3-2 | $(Tb_{0.996}Sc_{0.004})_3(Al_{0.97}Sc_{0.03})_5O_{12}$ | 83.6 | 60 | 42 | ⊚ |
| Example 3-3 | $(Tb_{0.996}Sc_{0.004})_3(Al_{0.97}Sc_{0.03})_5O_{12}$ | 83.1 | 60 | 37 | ○ |
| Example 3-4 | $(Tb_{0.996}Sc_{0.004})_3(Al_{0.97}Sc_{0.03})_5O_{12}$ | 83.2 | 60 | 32 | ○ |
| Example 3-5 | $(Tb_{0.996}Sc_{0.004})_3(Al_{0.97}Sc_{0.03})_5O_{12}$ | 83.6 | 60 | 41 | ⊚ |
| Example 3-6 | $(Tb_{0.996}Sc_{0.004})_3(Al_{0.97}Sc_{0.03})_5O_{12}$ | 83.1 | 60 | 34 | ○ |
| Example 3-7 | $(Tb_{0.996}Sc_{0.004})_3(Al_{0.97}Sc_{0.03})_5O_{12}$ | 83.4 | 60 | 32 | ○ |
| Comparative Example 3-1 | $(Tb_{0.996}Sc_{0.004})_3(Al_{0.97}Sc_{0.03})_5O_{12}$ | 82.1 | 60 | 29 | Δ |
| Comparative Example 3-2 | $(Tb_{0.996}Sc_{0.004})_3(Al_{0.97}Sc_{0.03})_5O_{12}$ | 74.5 | 60 | 27 | X |
| Comparative Example 3-3 | $(Tb_{0.996}Sc_{0.004})_3(Al_{0.97}Sc_{0.03})_5O_{12}$ | <0.1 | un-measurable | un-measurable | X |
| Comparative Example 3-4 | $(Tb_{0.996}Sc_{0.004})_3(Al_{0.97}Sc_{0.03})_5O_{12}$ | 80.3 | 60 | 22 | Δ |
| Comparative Example 3-5 | $(Tb_{0.996}Sc_{0.004})_3(Al_{0.97}Sc_{0.03})_5O_{12}$ | 83.4 | 60 | 28 | Δ |

A comparison of Examples 3-1 to 3-3 with Comparative Example 3-1 reveals the tendency that as the liquid temperatures of the first and second stirring steps are elevated, the size of crystal particles (primary particle size) after firing becomes larger. A comparison of Examples 3-4 and 3-5 with Comparative Example 3-2 reveals the tendency that the size primary particle size in the range of 70 to 300 nm, and if the primary particle size is outside the range, sintered bodies become less transparent or fully non-light-transmissive.

Comparative Example 3-5 shows a total luminous transmittance of at least 83%, but an extinction ratio of less than 30 dB due to the development of a crystal phase deemed heterogeneous, with an overall evaluation of mediocre (Δ). Namely, even when a ceramic material as a whole has a total luminous transmittance of acceptable level, the extinction ratio drops due to the development of a heterogeneous phase. This is probably because large scandium oxide particles are locally mixed to eventually induce compositional variations in the compact interior.

Example 4

A fired powder was prepared as in Example 2-4 except that constituent elements were changed such that either one of rare earth element or yttrium ion was incorporated at the coordinate site of Tb ion, and Al or Ga was incorporated at the coordinate site of Al ion. The fired powder was examined by XRD analysis and primary particle size measurement as in Example 1. It is noted that a rare earth element and a Group 13 element are combined so as to form a cubic crystal system which can be transparentized. Raw materials, rare earth oxide powder or yttrium oxide powder (each purity 99.999%, Shin-Etsu Chemical Co., Ltd.), gallium hydroxide powder (purity 99.9%, Shin-Etsu Chemical Co., Ltd.) or aluminum hydroxide powder (purity 99.999%, Nippon Light Metal Co., Ltd.), and scandium oxide powder (purity 99.9%, Shin-Etsu Chemical Co., Ltd.) were separately dissolved in 2N nitric acid aqueous solutions (Kanto Chemical Inc.). The amounts of powders added were adjusted such that the solutions had a concentration of 2M. In this way, (a) rare earth ion-containing aqueous solution, (b) Al or Ga ion-containing aqueous solution, and (c) Sc ion-containing aqueous solution were obtained.

The results are shown in Table 7.

TABLE 7

| | | 1st stirring | | 2nd stirring | | Firing | Measurement results | |
|---|---|---|---|---|---|---|---|---|
| | Composition | Liquid temp. (° C.) | Stirring time t1 (h) | Liquid temp. (° C.) | Stirring time t2 (h) | treatment Firing temp. (° C.) | XRD analysis | Primary particle size (μm) |
| Example 4-1 | $(Y_{0.996}Sc_{0.004})_3(Al_{0.97}Sc_{0.03})_5O_{12}$ | 30 | 4 | 30 | 20 | 1,200 | garnet | 120 |
| Example 4-2 | $(Tb_{0.996}Sc_{0.004})_3(Ga_{0.97}Sc_{0.03})_5O_{12}$ | 30 | 4 | 30 | 20 | 1,200 | garnet | 120 |
| Example 4-3 | $(Dy_{0.996}Sc_{0.004})_3(Al_{0.97}Sc_{0.03})_5O_{12}$ | 30 | 4 | 30 | 20 | 1,200 | garnet | 120 |
| Example 4-4 | $(Ho_{0.996}Sc_{0.004})_3(Al_{0.97}Sc_{0.03})_5O_{12}$ | 30 | 4 | 30 | 20 | 1,200 | garnet | 120 |
| Example 4-5 | $(Er_{0.996}Sc_{0.004})_3(Al_{0.97}Sc_{0.03})_5O_{12}$ | 30 | 4 | 30 | 20 | 1,200 | garnet | 120 |
| Example 4-6 | $(Tm_{0.996}Sc_{0.004})_3(Al_{0.97}Sc_{0.03})_5O_{12}$ | 30 | 4 | 30 | 20 | 1,200 | garnet | 120 |
| Example 4-7 | $(Lu_{0.996}Sc_{0.004})_3(Al_{0.97}Sc_{0.03})_5O_{12}$ | 30 | 4 | 30 | 20 | 1,200 | garnet | 120 |
| Example 4-8 | $(Y_{0.996}Sc_{0.004})_3(Ga_{0.97}Sc_{0.03})_5O_{12}$ | 30 | 4 | 30 | 20 | 1,200 | garnet | 120 |
| Example 4-9 | $(Sm_{0.996}Sc_{0.004})_3(Ga_{0.97}Sc_{0.03})_5O_{12}$ | 30 | 4 | 30 | 20 | 1,200 | garnet | 120 |
| Example 4-10 | $(Eu_{0.996}Sc_{0.004})_3(Ga_{0.97}Sc_{0.03})_5O_{12}$ | 30 | 4 | 30 | 20 | 1,200 | garnet | 120 |
| Example 4-11 | $(Gd_{0.996}Sc_{0.004})_3(Ga_{0.97}Sc_{0.03})_5O_{12}$ | 30 | 4 | 30 | 20 | 1,200 | garnet | 120 |
| Example 4-12 | $(Dy_{0.996}Sc_{0.004})_3(Ga_{0.97}Sc_{0.03})_5O_{12}$ | 30 | 4 | 30 | 20 | 1,200 | garnet | 120 |
| Example 4-13 | $(Ho_{0.996}Sc_{0.004})_3(Ga_{0.97}Sc_{0.03})_5O_{12}$ | 30 | 4 | 30 | 20 | 1,200 | garnet | 120 |
| Example 4-14 | $(Er_{0.996}Sc_{0.004})_3(Ga_{0.97}Sc_{0.03})_5O_{12}$ | 30 | 4 | 30 | 20 | 1,200 | garnet | 120 |
| Example 4-15 | $(Tm_{0.996}Sc_{0.004})_3(Ga_{0.97}Sc_{0.03})_5O_{12}$ | 30 | 4 | 30 | 20 | 1,200 | garnet | 120 |
| Example 4-16 | $(Yb_{0.996}Sc_{0.004})_3(Ga_{0.97}Sc_{0.03})_5O_{12}$ | 30 | 4 | 30 | 20 | 1,200 | garnet | 120 |
| Example 4-17 | $(Lu_{0.996}Sc_{0.004})_3(Ga_{0.97}Sc_{0.03})_5O_{12}$ | 30 | 4 | 30 | 20 | 1,200 | garnet | 120 |

Using the fired powders, transparent sintered bodies were manufactured as in Example 2-4.

The sample was evaluated for optical properties (total luminous transmittance, extinction ratio) as in Example 1. Notably, in Examples 4-3, 4-9, 4-12 and 4-16, the total luminous transmittance was measured at wavelength 633 nm.

The results are summarized in Table 8.

TABLE 8

|  | Composition | Total luminous transmittance @ 1,064 nm (%) | Extinction ratio (dB) |
|---|---|---|---|
| Example 4-1 | $(Y_{0.996}Sc_{0.004})_3(Al_{0.97}Sc_{0.03})_5O_{12}$ | 82.4 | 46 |
| Example 4-2 | $(Tb_{0.996}Sc_{0.004})_3(Ga_{0.97}Sc_{0.03})_5O_{12}$ | 81.8 | 42 |
| Example 4-3 | $(Dy_{0.996}Sc_{0.004})_3(Al_{0.97}Sc_{0.03})_5O_{12}$ | 78.9 @ 633 nm | 38 |
| Example 4-4 | $(Ho_{0.996}Sc_{0.004})_3(Al_{0.97}Sc_{0.03})_5O_{12}$ | 71.8 | 45 |
| Example 4-5 | $(Er_{0.996}Sc_{0.004})_3(Al_{0.97}Sc_{0.03})_5O_{12}$ | 73.2 | 42 |
| Example 4-6 | $(Tm_{0.996}Sc_{0.004})_3(Al_{0.97}Sc_{0.03})_5O_{12}$ | 82.2 | 44 |
| Example 4-7 | $(Lu_{0.996}Sc_{0.004})_3(Al_{0.97}Sc_{0.03})_5O_{12}$ | 82.4 | 41 |
| Example 4-8 | $(Y_{0.996}Sc_{0.004})_3(Ga_{0.97}Sc_{0.03})_5O_{12}$ | 81.9 | 42 |
| Example 4-9 | $(Sm_{0.996}Sc_{0.004})_3(Ga_{0.97}Sc_{0.03})_5O_{12}$ | 79.9 @ 633 nm | 37 |
| Example 4-10 | $(Eu_{0.996}Sc_{0.004})_3(Ga_{0.97}Sc_{0.03})_5O_{12}$ | 80.5 | 40 |
| Example 4-11 | $(Gd_{0.996}Sc_{0.004})_3(Ga_{0.97}Sc_{0.03})_5O_{12}$ | 81.1 | 41 |
| Example 4-12 | $(Dy_{0.996}Sc_{0.004})_3(Ga_{0.97}Sc_{0.03})_5O_{12}$ | 77.2 @ 633 nm | 36 |
| Example 4-13 | $(Ho_{0.996}Sc_{0.004})_3(Ga_{0.97}Sc_{0.03})_5O_{12}$ | 72 | 41 |
| Example 4-14 | $(Er_{0.996}Sc_{0.004})_3(Ga_{0.97}Sc_{0.03})_5O_{12}$ | 71 | 43 |
| Example 4-15 | $(Tm_{0.996}Sc_{0.004})_3(Ga_{0.97}Sc_{0.03})_5O_{12}$ | 80.8 | 41 |
| Example 4-16 | $(Yb_{0.996}Sc_{0.004})_3(Ga_{0.97}Sc_{0.03})_5O_{12}$ | 79.9 @ 633 nm | 38 |
| Example 4-17 | $(Lu_{0.996}Sc_{0.004})_3(Ga_{0.97}Sc_{0.03})_5O_{12}$ | 81.4 | 44 |

As is evident from the results, a high total luminous transmittance is available when Tb is replaced by another rare earth element or Y and also when Al is replaced by another Group 13 element. In all cases, a high extinction ratio is available. When a certain element (i.e., composition) is selected, a transmittance of at least 83% is not always available because the material is absorptive at 1,064 nm band or has a different refractive index. For example, when Ho or Er is selected, the material is absorptive at 1,064 nm band. In the case of absorptive material, measurement is made at wavelength 633 nm instead of 1,064 nm.

Japanese Patent Application No. 2017-237466 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a sinterable garnet-structure complex oxide powder comprising the steps of adding an aqueous solution containing (a) at least one rare earth element selected from among yttrium and lanthanoid elements in ion form, an aqueous solution containing (b) at least one element selected from Group 13 elements in ion form, and an aqueous solution containing (c) scandium ion, to a co-precipitating aqueous solution, allowing the resulting solution to induce a co-precipitate of components (a), (b) and (c), filtering, heat drying and firing the co-precipitate, thereby forming a garnet-structure complex oxide powder having the formula (1):

$$(R_{1-x}Sc_x)_3(A_{1-y}Sc_y)_5O_{12} \quad (1)$$

wherein R is at least one rare earth element selected from among yttrium and lanthanoid elements, A is at least one element selected from Group 13 elements, x and y are numbers in the range: $0 < x < 0.08$ and $0.004 < y < 0.16$.

2. The method of claim 1 wherein component (a) is terbium ion and component (b) is aluminum ion.

3. The method of claim 1 wherein the aqueous solutions containing components (a), (b) and (c) are mineral acid aqueous solutions, and the co-precipitating aqueous solution is a carbonate aqueous solution.

4. The method of claim 1 wherein the aqueous solution containing component (a), the aqueous solution containing component (b), and the aqueous solution containing component (c) are added together to a co-precipitating aqueous solution, and the resulting solution is stirred, allowing particles of the co-precipitate of components (a), (b) and (c) to grow.

5. The method of claim 4 wherein the stirring is continued for at least 12 hours while keeping the solution at a temperature of from 20° C. to 50° C.

6. The method of claim 1 wherein the aqueous solution containing component (a) and the aqueous solution containing component (b) are added together to a co-precipitating aqueous solution, the resulting solution is stirred as a first stirring step, the aqueous solution containing component (c) is added thereto, and the resulting solution is stirred as a second stirring step.

7. The method of claim 6 wherein each of the first and second stirring steps includes keeping the solution at a temperature of from 20° C. to 50° C., and the total time of the first and second stirring steps is at least 12 hours.

8. The method of claim 1 wherein the firing step is at a temperature of from 1,000° C. to 1,400° C.

9. The method of claim 1 wherein the garnet-structure complex oxide powder has a primary particle size of from 70 nm to 300 nm.

10. A method for manufacturing a transparent ceramic material comprising the steps of molding the garnet-structure complex oxide powder prepared by the method of claim 1, into a compact, sintering the compact, and pressure sintering the compact.

* * * * *